United States Patent
Hake et al.

(10) Patent No.: US 6,802,562 B1
(45) Date of Patent: Oct. 12, 2004

(54) SEAT BACK FOR A VEHICLE SEAT COMPRISING AN INTEGRATED PROTECTIVE DEVICE

(75) Inventors: Ernst-Jürgen Hake, Radevormwald (DE); Hans-Joachim Müller, Bergisch Gladbach (DE); Gerhard Schmale, Huckeswagen (DE); Lutz Strieder, Remscheid (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/049,698

(22) PCT Filed: Aug. 16, 2000

(86) PCT No.: PCT/EP00/07995

§ 371 (c)(1),
(2), (4) Date: Jun. 24, 2002

(87) PCT Pub. No.: WO01/12465

PCT Pub. Date: Feb. 22, 2001

(30) Foreign Application Priority Data

Aug. 17, 1999 (DE) .......................................... 199 38 904

(51) Int. Cl.$^7$ ............................................ B60N 2/427
(52) U.S. Cl. ............................. 297/216.12; 297/216.14; 297/408
(58) Field of Search ....................... 297/216.12, 216.13, 297/216.14, 408

(56) References Cited

U.S. PATENT DOCUMENTS

| | | | | |
|---|---|---|---|---|
| 2,973,029 A | * | 2/1961 | Schlosstein | 297/216.12 |
| 5,694,320 A | * | 12/1997 | Breed | 701/45 |
| 5,795,019 A | | 8/1998 | Wieclawski | |
| 5,822,707 A | | 10/1998 | Breed et al. | 701/49 |
| 5,823,619 A | | 10/1998 | Hellig et al. | |
| 5,833,312 A | | 11/1998 | Lenz | 297/216.13 |
| 5,882,071 A | | 3/1999 | Fohl | 297/216.12 |
| 5,927,804 A | | 7/1999 | Cuevas | |
| 5,934,750 A | * | 8/1999 | Fohl | 297/216.12 |
| 6,019,424 A | | 2/2000 | Ruckert et al. | |
| 6,033,018 A | | 3/2000 | Fohl | |
| 6,045,181 A | * | 4/2000 | Ikeda et al. | 297/216.12 |
| 6,082,817 A | * | 7/2000 | Muller | 297/216.12 |
| 6,158,812 A | * | 12/2000 | Bonke | 297/391 |
| 6,273,511 B1 | | 8/2001 | Wieclawski | |
| 6,478,373 B1 | * | 11/2002 | Hake et al. | 297/216.13 |

FOREIGN PATENT DOCUMENTS

| | | |
|---|---|---|
| DE | 22 32 726 | 1/1974 |
| DE | 3131633 A1 * | 2/1983 |
| DE | 197 38 201 A1 | 4/1998 |
| DE | 197 43 339 A1 | 4/1998 |
| DE | 199 38 940 A1 | 3/2000 |
| DE | 199 45 411 A1 | 5/2000 |
| GB | 2340801 A | 3/2000 |
| JP | 04 197840 | 7/1992 |
| JP | 08 187139 | 7/1996 |
| WO | WO 01/12465 A1 | 2/2001 |

OTHER PUBLICATIONS

European Search Report for EP 00 11 3321, dated Dec. 1, 2000.
International Search Report for PCT/EP00/07995, dated Dec. 28, 2000.

* cited by examiner

Primary Examiner—Peter M. Cuomo
Assistant Examiner—Joseph Edell
(74) Attorney, Agent, or Firm—Foley & Lardner LLP (57) ABSTRACT

The invention concerns a seatback for a vehicle seat, having an integrated protective device. The protective device includes a device that generates a torque acting in a pivoting direction on an upper back part, a rear-end impact detector that is in effective connection with the torque-generating device in such a way that the device is activated in the event of the rear-end impact and the pivoting motion is initiated, and an immobilization device for retention of the upper back part in the normal use position.

8 Claims, 7 Drawing Sheets

SEAT BACK FOR A VEHICLE SEAT COMPRISING AN INTEGRATED PROTECTIVE DEVICE

FIELD OF THE INVENTION

The present invention concerns a seatback for a vehicle seat, having an integrated protective device against accident-related injuries in the event of a rear-end impact, in particular against cervical vertebra syndrome or acceleration trauma, having a lower back part joined to a seat part and having a upper back part that is pivotable relative to the lower back part out of a normal use position, about an axis extending in the seatback transversely to the longitudinal vehicle axis, through an angular range in a pivoting direction pointing in the direction of travel, as a result of a torque acting in the pivoting direction.

BACKGROUND OF THE INVENTION

Many present-day developments in automotive engineering are aimed toward using available materials and design methods to make the seatbacks of vehicle seats lightweight but highly rigid, in order (despite the light weight) to withstand the large stresses that occur in an accident event and to sufficiently support the body of the vehicle occupant. The result of this, however, is that for example even in a so-called "fender-bender" accident or low-speed crash at low velocities in the range from 10 to 30 km/h, in which the body experiences an acceleration of approx. 8 to 20 G, damage to the body's neck musculature and cervical vertebrae can occur, since the impact force acts in almost undamped fashion on the person. An undesirable effect, called the "whip effect," occurs on the head and neck, resulting in hyperextension and overstressing of the cervical vertebrae and support muscles of the head. This effect, and the spinal column injuries possible in particular in the neck region, are also referred to using the English term "whiplash."

Passive and active apparatuses are known for protection against these injuries; the latter, in the event of an accident, are intended to actively decrease the distance between the person's head and the headrest of the seatback. One such known (active) apparatus of the kind cited above is described in DE 197 43 339 A1. In this context, the body of the vehicle occupant (seat user)—which in the event of an impact relative to the direction of travel is bent backward or accelerated, as a result of its inertia, into the seatback of the vehicle seat—encounters an impact panel that is mounted below the pivot axis of the upper back part and is joined pivotably to the upper back part, in particular to a headrest on the back part. The relative motion of the impact panel toward the rear causes the headrest to pivot forward. The motion of the headrest is intended to mitigate the whiplash effect.

It is disadvantageous in this context that the relative motion of the headrest does not occur until the occupant is thrown into the seatback. As a result, the upper back part can be accelerated only by a value that is equal, at most, to the acceleration value experienced by the vehicle seat as a result of the impact. Since the motion characteristics of the seat user cannot be accurately predicted in every case, however, in some circumstances the active counter-motion of the seatback or headrest may in fact cause incorrect, undesired, possibly dangerous effects. For example, the impact of the occupant's head can in fact be further amplified, and occupant "ramping" (vertical movement in the seat) also cannot be prevented. This is because in a rear-end impact, the occupant is accelerated into the seatback (which is usually tilted backward out of the vertical) in such a way that he or she tends to rise up along the seatback as if it were a ramp. This generally results in failure of the seatback, which buckles due to overload and is no longer capable of supporting the occupant. In particular, the seat user's head can end up at a height which is above the headrest, where it can no longer be supported. A considerable residual accident risk thus exists with the known seatback.

Mechanisms that are triggered by displacement of the vehicle occupant's body into the seatback opposite to the direction of travel do not exhibit the desired protective effect. The differing heights and therefore weights of vehicle users prove to be a particular disadvantage. Because of this, it is impossible to ensure reliably that the triggering device of a protective device is correct and effective. A further uncertainty factor is the delayed reaction of the previously disclosed mechanisms of this type. The configuration of the upholstery of the seatback also plays an important part; it should be as thin as possible in the region of the triggering device. This would in turn, however, result in an undesirable degradation of upholstery comfort.

It has therefore been proposed in German Patent Application 199 38 904.7 that reliable triggering of the protective device be performed, irrespective of the vehicle occupant's build, at a minimum acceleration which can be measured, for example, at the vehicle seat. In the case of a small car, the measured acceleration value is reached at a considerably lower impact speed than is the case for a sedan with a large absorbing crumple zone, or for a truck. The proposed protective device has on the one hand a device that, irrespective of the occupancy of the vehicle seat, generates the torque acting in the pivoting direction on the upper back part; on the other hand it comprises means for detecting a rear-end impact that are in effective connection with the torque-generating device in such a way that the device is activated in the event of the rear-end impact and the pivoting motion is initiated. Also provided in this context are immobilization means for retention of the upper back part in the normal use position, and immobilization means for retention of the upper back part against a backward motion out of the safety position into the normal use position.

It is the object of the present invention to create, using means of little design complexity, a seatback of the aforesaid kind whose protective device guarantees improved protection of the respective seat user against injury, in particular by way of an improved interception capability and damping when the head and upper body of the person present on the seat strike the headrest and seatback. The intention is to implement, in particular in the normal use position and additionally in the safety position, an effective immobilization system that nevertheless does not impede the triggering operation.

SUMMARY OF THE INVENTION

The object of the invention is achieved by a seatback of the kind cited initially in which the protective device comprises at least the following parts:
  a device that, irrespective of any occupancy of the vehicle seat, generates the torque acting in the pivoting direction on the upper back part;
  means for detecting a rear-end impact that are in effective connection with the torque-generating device in such a way that the device is activated in the event of the rear-end impact and the pivoting motion is initiated; and immobilization means for retention of the upper back part in the normal use position, the immobilization means being constituted by a lever system, and the means for detecting a rear-end impact being in effective connection with the immobilization means for retention of the upper back part in the normal use position in such a way that in the event of the impact, the retention of the upper back part in the normal use position is nullified.

According to the present invention, in particular because of the unlocking of the lever system, pivoting of the upper back part can preferably proceed so quickly that the upper back part is in the safety position before the onset of any head motion of the seat user resulting from the rear-end impact. In the safety position, the upper back part rests directly against the seat user's body so that the user, despite the acceleration acting on him or her due to the impact, advantageously can no longer freely move backward against the vehicle's direction of travel and incur accidental injuries.

In the context of the seatback according to the present invention, it is particularly advantageous in terms of the efficiency of the protective device if a headrest is attached in or on the upper back part. It is useful in this context to mount the headrest, which as a rule is guided on holding rods for adjustment of the vertical position, in the backrest at the height of the shoulder region tiltably about an axis extending transversely to the vehicle axis. For this purpose, for example, an upper crossmember of the seatback can be attached in upper portions of the side members of the seatback by means of a pivot bearing. The upper back part can also, however, be configured in such a way that it assumes the function of a headrest. In any event, the person using the vehicle seat can as a result move uniformly into the seatback with decelerating energy absorption by the vehicle seat, with particular protection of the neck and head region. The result is that when the normal use position of the seatback exists, the headrest is in a so-called comfort position in which its spacing from a seat user's head can be approximately 40 to 110 mm. As a result of the pivoting motion of the upper back part, the headrest is then transferred into a so-called interception position, in which its spacing from a seat user's head is zero or almost zero. The normal use position and safety position of the upper back part thus correspond, when a headrest is present, to the latter's comfort position and interception position.

It is advantageous to provide a force storage device or energy storage device as the torque-generating device for the pivoting motion of the crossmember carrying the headrest. A preloaded torsion spring, in particular, has proven advantageous in this context, since it possesses a very low intrinsic acceleration and therefore requires less installation space for the same effect as compared to tension or compression springs.

The lever system of the immobilization means for retention of the upper back part in the normal use position can preferably comprise at least two coacting levers. A first lever (hereinafter called the pawl) can brace the pivotable crossmember, preloaded by the torsion spring, with respect to a stationary counterbearing; while a second lever (hereinafter called the immobilization lever) acts as immobilizer for the pawl. In the event of a rear-end impact, the immobilization lever is pivoted in such a way that it releases the immobilization of the pawl. Triggering of the immobilization lever can be effected with a very low actuation force, thereby making possible a very fast lever movement and thus rapid unlatching of the pawl.

Actuation of the immobilization lever can preferably be accomplished with an electromagnet which obtains its pulse from a sensor, such as an acceleration sensor, that is used as a means for detecting the rear-end impact.

After release of the pawl, the latter pivots out of its bracing position; and the crossmember of the seatback, with the headrest, can move in the direction of the back of the vehicle occupant's head.

After a triggering of the protective device, the latter can be brought back into its initial position by once again activating the device that generates the torque acting on the upper back part (e.g. by tensioning the torsion spring); for safety reasons, this operation is to be performed only in a repair shop, in which seat functionality after a crash can concurrently also be checked.

It is particularly advantageous, in terms of reliably preventing a spring-back or bounce-back effect when the protective device takes effect, if the immobilization means for retention of the upper back part against a backward motion from the safety position into the normal use position (which means are also referred hereinafter to as the "recoil lock") are embodied so that they make possible immobilization not only in the normal use position and in the safety position, but also in multiple positions located therebetween. This can be implemented, for example, by means of self-locking rolling-element or wedge-type locks that operate positively or nonpositively (preferably by jamming), or by means of a ratchet device. A suitable design of the recoil lock advantageously makes it possible to limit any recoil play of the upper back part (motion in the direction of the safety position) to a maximum angular magnitude of 1 degree.

Further advantageous embodiment features of the invention are contained in the dependent claims and in the description below.

BRIEF DESCRIPTION OF THE DRAWINGS

The invention will be explained more thoroughly, by way of example, with reference to the drawings, in which.

DETAILED DESCRIPTION OF THE PREFERRED EMBODIMENTS

In the various Figures of the drawings, identical parts are always given the same reference characters, so that as a rule each is also described only once.

Figure 1:
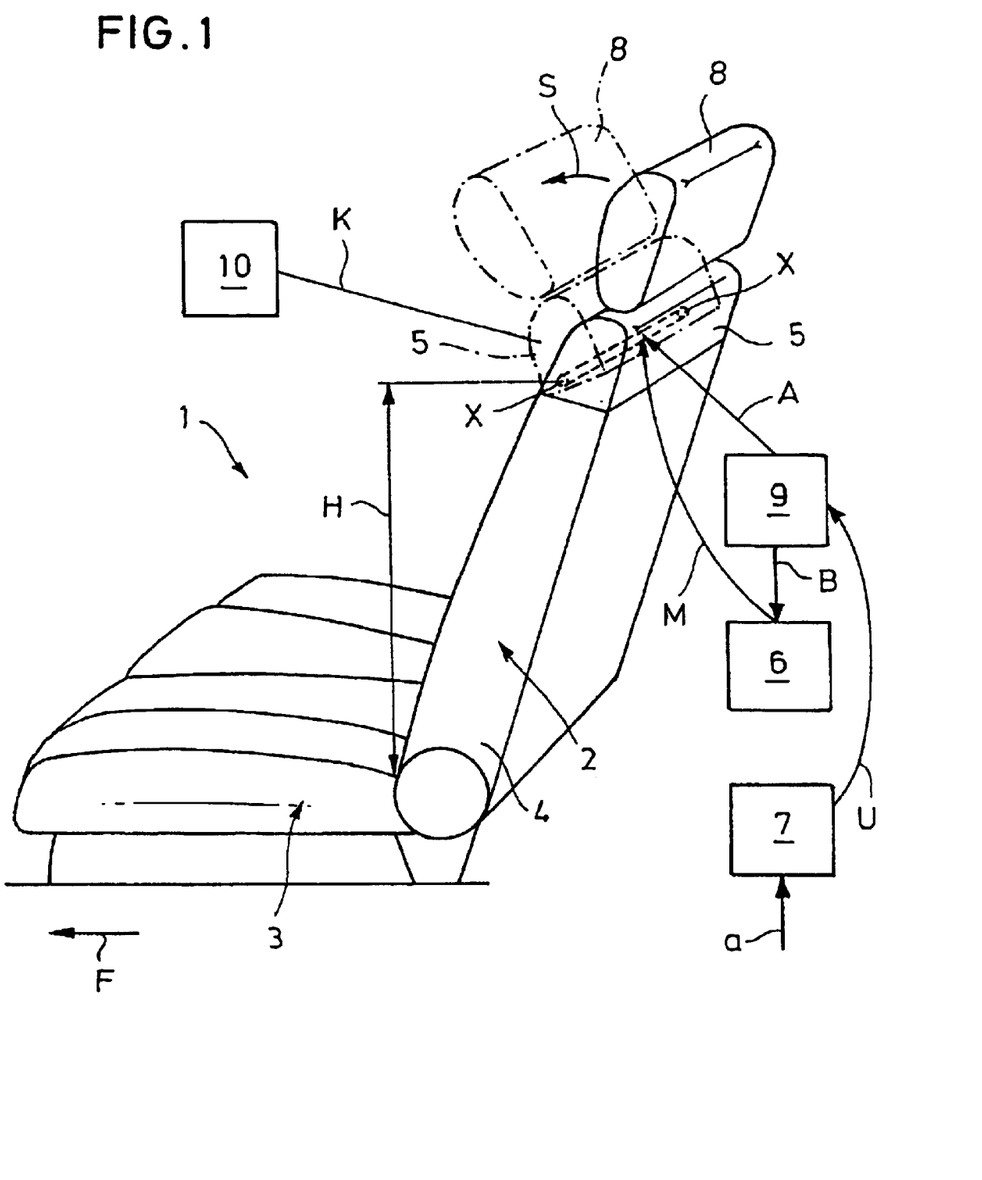
FIG. 1 is a perspective, partially schematic side view of a seatback according to the present invention.

As is evident firstly from FIG. 1, a vehicle seat 1 comprises a seatback 2 according to the present invention and a seat part 3. Integrated into seatback 2 is a protective device that serves to protect the person in question against accident-related injuries, in particular cervical vertebra syndrome or acceleration trauma in the event of a rear-end impact. Seatback 2 has a lower back part 4 joined to seat part 3, and an upper back part 5 that is pivotable relative to lower back part 4 out of a normal use position (drawn with solid lines in FIG. 1), about an axis X—X extending in seatback 2 transversely to the longitudinal vehicle axis, through an angular range in a pivoting direction S pointing in direction of travel F into a safety position (drawn with dot-dash lines in FIG. 1), as a result of a torque acting in pivoting direction S.

According to the present invention, the protective device comprises on the one hand a device 6 that, irrespective of any occupancy of the vehicle seat 2, generates the torque (arrow M in FIG. 1) acting in pivoting direction S on upper back part 5, and on the other hand comprises means 7 for detecting a rear-end impact. Both torque-generating device 6 and detection means 7 can be differently configured. These parts of seatback 2 according to the present invention are therefore shown merely schematically (as boxes) in FIG. 1.

Torque-generating device 6 can advantageously, for example, be constituted by a force storage device or energy storage device, in particular by a preloaded spring element or multiple preloaded spring elements. In the various embodiments of the invention that are depicted in the further Figures, the torque-generating device is embodied as a leaf-shaped torsion spring (torsional spring 6a) lying in pivot axis X—X of upper back part 5 that extends transversely to the longitudinal vehicle axis, which spring advantageously has a very low intrinsic acceleration and requires little installation space for the same effect as compared to tension or compression springs (cf. especially FIG. 3).

Means 7 for detecting the rear-end impact can advantageously be constituted by a vehicle crash sensor, such as an acceleration sensor. To detect a so-called low-speed crash, the vehicle crash sensor can be adjusted in such a way that it responds at an acceleration a of approximately 40 to 80 m/s2. As already mentioned, the acceleration value at which the sensor responds is based on the type and configuration of a particular motor vehicle (small car, sedan with absorbing crumple zone, truck).

Detection means 7 can be in effective connection with torque-generating device 6 in such a way that device 6 activates in the event of the rear-end impact and the pivoting motion of upper back part 5 is initiated. Lower back part 4 remains in its original (normal use) position.

In order to ensure optimum protection of the seat user, lower back part 4 and upper back part 5 can preferably be matched in defined fashion to one another in terms of their respective lengths (not characterized further); and axis X—X extending transversely to the longitudinal vehicle axis, about which upper back part 5 is pivotable, can be arranged at a defined height H in the shoulder region of a seat user, preferably approximately 400 to 580 mm above seat part 3.

Attached in or on upper back part 5 is a headrest 8 that in the event of a rear-end impact is moved out of a comfort position (drawn with solid lines in FIG. 1), in which its spacing (A1 in FIG. 2) from a seat user's head is approximately 80 to 120 mm, into an interception position (drawn with dot-dash lines in FIG. 1), in which its spacing (A2 in FIG. 2) from a seat user's head is zero or almost zero.

Also provided are immobilization means 9 for retention of upper back part 5 in the normal use position. The retention is illustrated by arrow A in FIG. 1. As will be described in further detail below with reference to FIGS. 3 through 5, these immobilization means 9 are constituted by a lever system. Arrow B in FIG. 1 indicates that immobilization means 9 can block the action of torque-generating device 6.

Means 7 for detecting a rear-end impact are in effective connection (arrow U in FIG. 1) with immobilization means 9 for retention of upper back part 5 in the normal use position in such a way that in the event of the impact, retention A of upper back part 5 in the normal use position, and blocking B of torque-generating device 6, are nullified.

Further immobilization means 10, whose effect is illustrated by arrow K in FIG. 1 and which are explained in more detail below with reference to FIGS. 4 through 8, can advantageously be provided to retain upper back part 5 against a backward motion out of the safety position into the normal use position.

In the embodiment of the invention just described, the protective device against accident-related injuries, integrated into seatback 2 and not further characterized as a whole, is thus constituted by: lower back part 4; upper back part 5, pivotable about axis X—X, having headrest 8; torque-generating device 6; means 7 for detecting a rear-end impact; immobilization means 9, configured as a lever system, for retention of upper back part 5 in the normal use position; and immobilization means 10 for retention of upper back part 5 against a backward motion out of the safety position into the normal use position.

Figure 2:
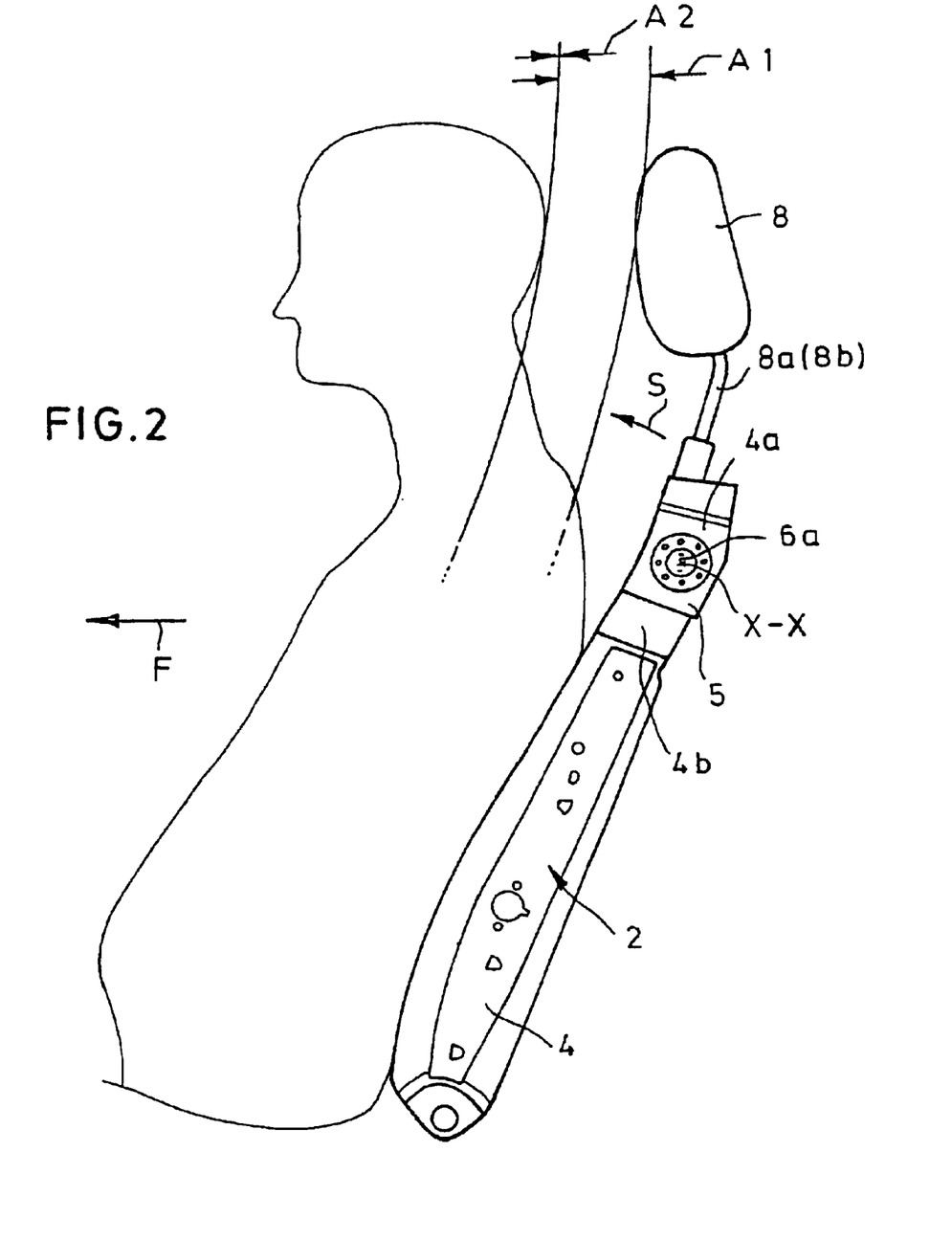
FIG. 2 is a side view of a preferred embodiment of a seatback, with a depiction of a seat user.
Figure 3:
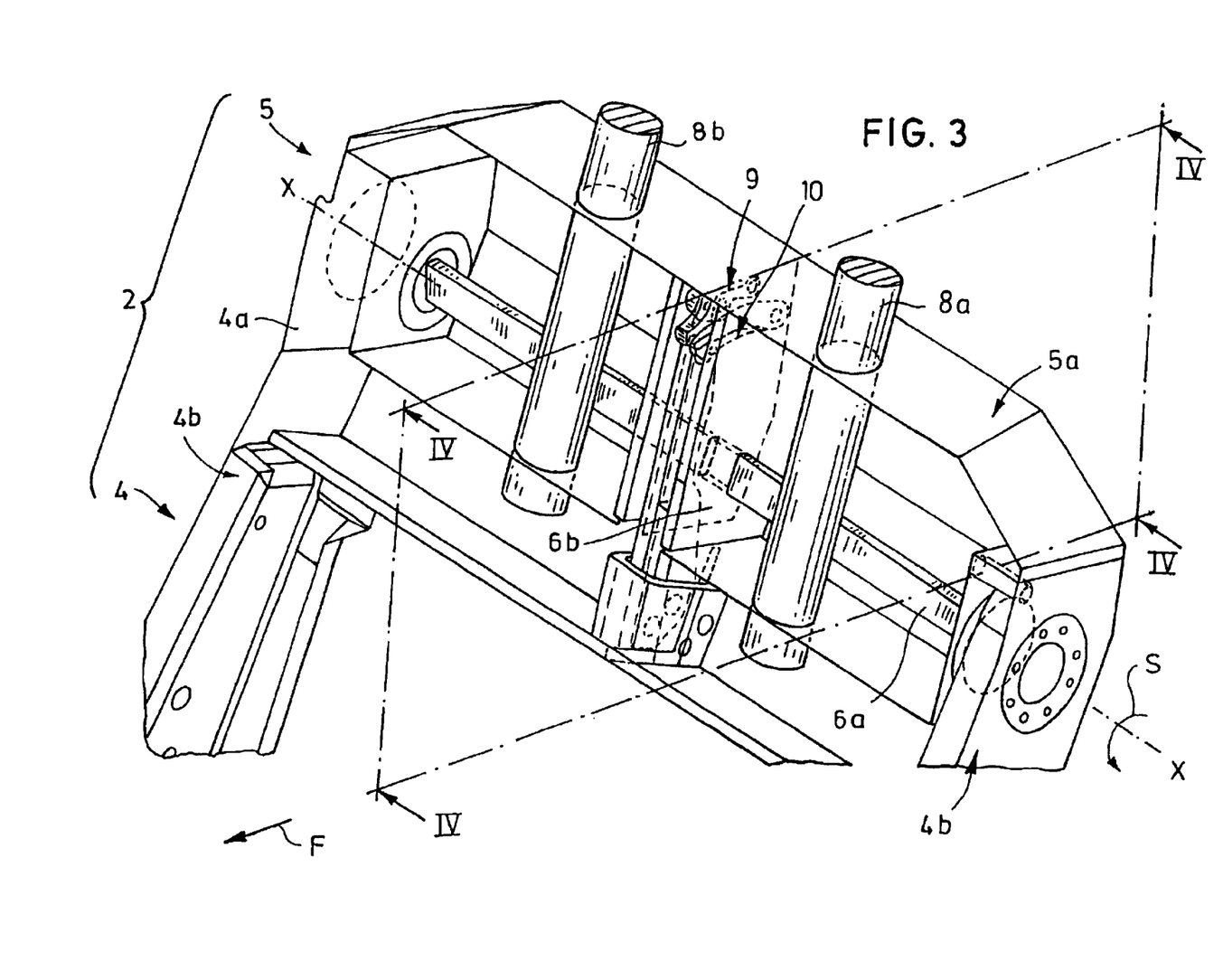
FIG. 3 is a perspective depiction of the upper part of the seatback according to the present invention depicted in FIG. 2.

FIG. 3, which shows an enlarged detail of seatback 2 according to the present invention depicted in FIG. 2 in the region of the transition from lower back part 4 to upper back part 5, illustrates a preferred concrete embodiment for device 6 which, irrespective of any occupancy of vehicle seat 2, generates torque M that acts in pivoting direction S on upper back part 5; for immobilization means 9, configured as a lever system, for retention of upper back part 5 in the normal use position; and for immobilization means 10 (recoil lock) for retention of upper back part 5 against backward motion out of the safety position into the normal use position.

As has already been mentioned, torque-generating device 6 in FIG. 3 is configured as a preloaded spring element, specifically as a leaf-shaped torsion spring 6a mounted in upper back part 5. With a torsion spring 6a of this kind, it is advantageously possible to generate very high displacing forces or a very high torque M, which enables pivoting of upper back part 5 in a matter of milliseconds. It has proven advantageous for the spring element if it exhibits a descending characteristic curve that exhibits high initial force to generate strong acceleration, but only a very low final force. This takes into account particularly the fact that because of its arrangement in the vehicle, upper back part 5 experiences as a result of the crash an acceleration that goes against the action of the spring element. It is, in particular, extremely advantageous if torque-generating device 6 is designed in such a way that in the event of its activation, upper back part 5 is accelerated in pivoting direction S at a magnitude greater than a measured (or, preferably, an empirically determined) average magnitude of acceleration a that vehicle seat 2 experiences because of the rear-end impact; this can be adjusted by way of the spring characteristic curve (thickness and material of torsion spring 6a).

Visible in FIG. 3, as known per se, are holding rods 8a, 8b of headrest 8 that are provided for adjusting the vertical position, by means of which headrest 8 is mounted in seatback 2 at the height of the shoulder region of a seat user, tiltably about an axis X—X extending transversely to the vehicle axis (see H in FIG. 1 regarding the vertical location of axis X—X). For this purpose, an upper crossmember 5a of seatback 2 that carries holding rods 8a, 8b is mounted pivotably (pivoting direction S) about axis X—X in which torsion spring 6a lies, in respective upper attachment segments 4a that project beyond lower back part 4 on two side members 4b immovably joined to lower back part 4. Torsion spring 6a itself is clamped laterally at its ends in attachment segments 4a and immovably joined to crossmember 5a approximately centeredly via a holding part 6b. It can thus be preloaded in the normal use position (depicted exclusively in FIG. 4 and as one position in FIG. 5) by a pivoting movement opposite to the indicated pivoting direction S.

Provided as immobilization means 9 for retention of upper back part 5 in the normal use position is a lever system which is carried by two side walls (not further designated) of holding part 6b (configured, in particular, as a pocket) and which acts as a positive or nonpositive lock.

Figure 4:
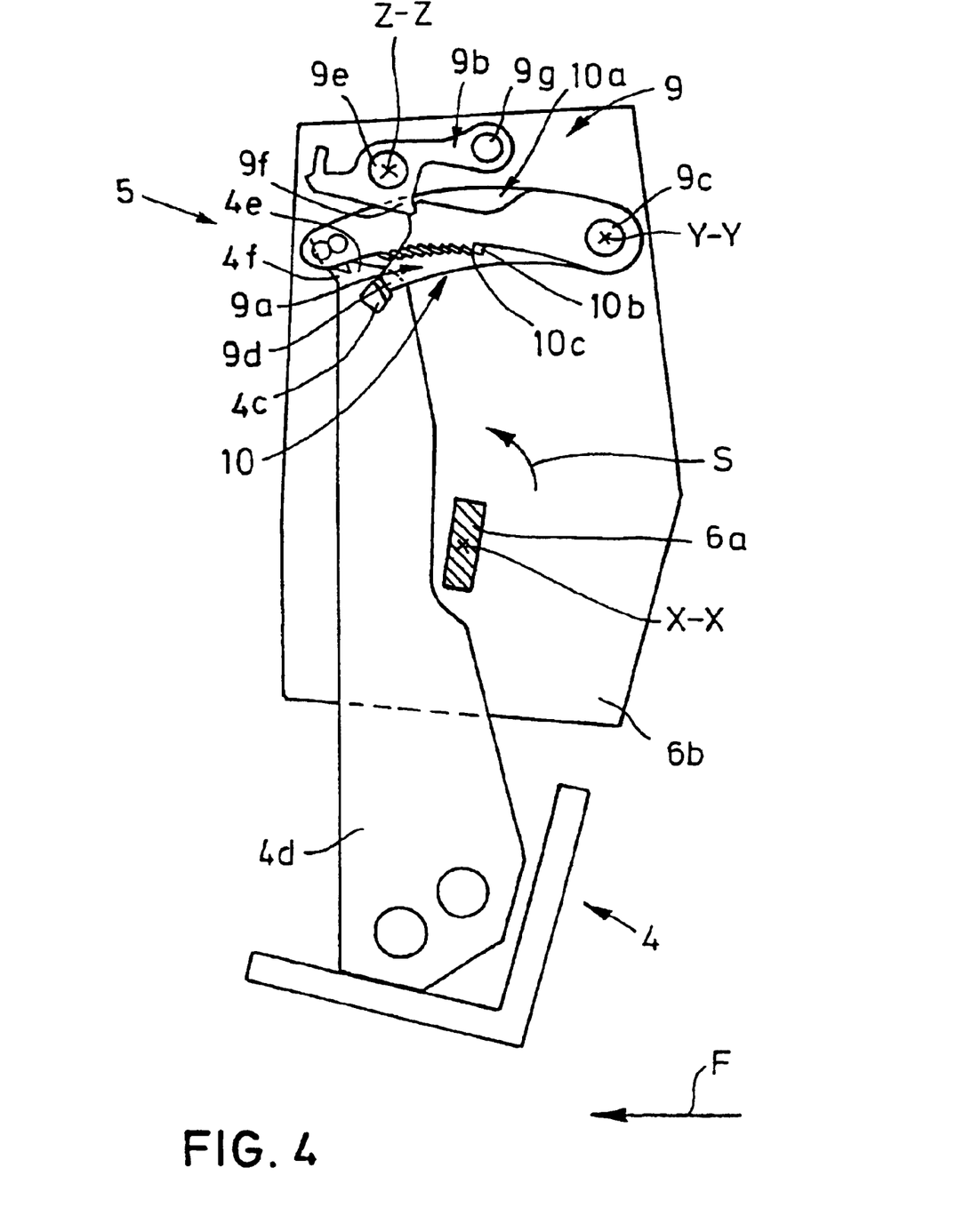
FIG. 4 is a sectional side view through the upper part of the seatback according to the present invention depicted in FIG. 3, in a central region (plane IV—IV—IV—IV)
Figure 5:
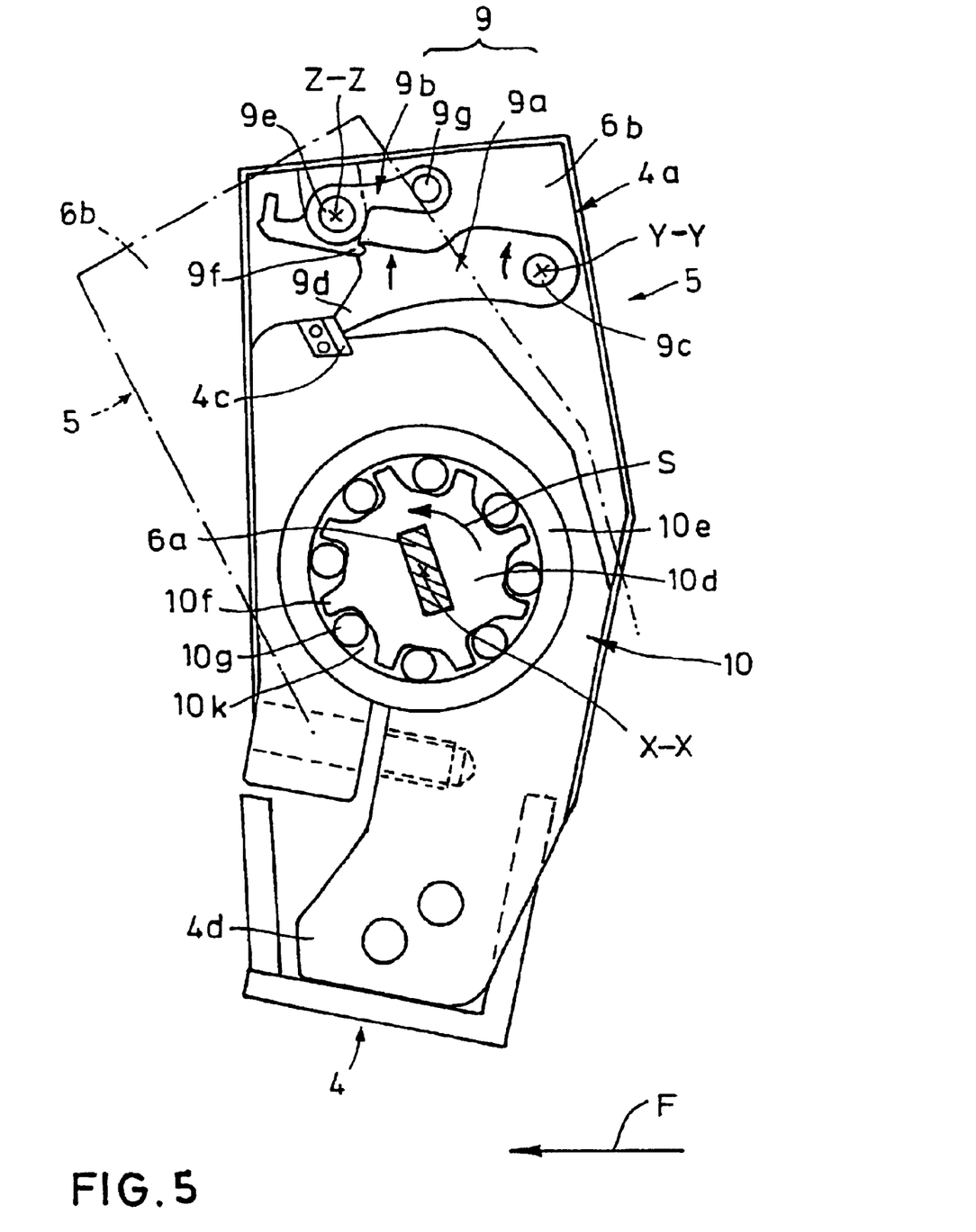
FIG. 5 shows a further embodiment of a seatback according to the present invention in a sectioned side view corresponding to FIG. 4.

In the embodiments depicted, as shown in more detail by FIG. 4 and in particular FIG. 5 as well, the lever system comprises two coacting levers 9a, 9b that are mounted pivotably in holding part 6b. A first lever (pawl 9a), in particular of one-armed configuration, is mounted laterally in bearings 9c of holding part 6b (in which context bearing axis Y—Y extends parallel to rotation axis X—X of upper back part 5), and braces pivotable crossmember 5a, which is preloaded by torsion spring 6a, against a stationary counterbearing 4c. Counterbearing 4c is located at the upper end of a support part 4d that is immovably joined at the other end to lower back part 4 and projects into pocket-like holding part 6b, and is constituted by a stop surface for a lobe 9d of pawl 9a arranged approximately at the unattached lever end. In a locked position of pawl 9a, lobe 9d rests against counterbearing 4c.

The second lever (immobilization lever 9b), in particular of two armed configuration, serves to lock pawl 9a in its locked position. It is mounted laterally in bearings 9e of holding part 6b (in which context bearing axis Z—Z once again extends parallel to rotation axis X—X of upper back part 5), and in its locked position engages with a locking lobe 9f positively into pawl 9a in such a way so that the latter cannot move out of its locked position. The depictions in FIGS. 4 and.5 each show the locked positions of pawl 9a and immobilization lever 9b.

If the requirement occurs (i.e. a rear-end impact), immobilization lever 9b is pivoted about its bearing axis Z—Z (clockwise in the depictions of FIGS. 4 and 5), the positive engagement of locking lobe 9f into pawl 9a being nullified and pawl 9a being released for a pivoting motion about its axis Y—Y (also clockwise in the depictions of FIGS. 4 and 5). Triggering of immobilization lever 9b can be accomplished with a very small actuation force acting at one lever end 9g, and advantageously is brought about by means of an electromagnet (not depicted) which receives its switching pulse from a sensor (constituting means 7 for detection of the rear-end impact).

Once pawl 9a has been released by immobilization lever 9b, it is pivoted (clockwise in accordance with the selected depiction), solely by the action of torsion spring 6a, about its bearing axis Y—Y out of its locked position into its released position. In that context, the friction between the stationary stop surface of counterbearing 4c and the support surface on lobe 9d of pawl 9a is overcome. Crossmember 4a pivots with headrest 8 in the direction of the back of the vehicle occupant's head (interception position of headrest 8). The positions assumed in this context by upper back part 5 and headrest 8 are drawn with dot-dash lines in FIG. 1, as already mentioned, and are labeled in FIG. 5 (for the second preferred embodiment of the invention) with dot-dash reference lines.

Alternatively to the sensor embodiment, means 7 for detecting the rear-end impact could also be constituted by a mechanical control system that comprises mechanical parts which, accelerated by the action of the rear-end impact, bring immobilization lever 9b out of engagement, i.e. into an unlocked position. This, too, corresponds to a direct effective connection U from means 7 for detecting the rear-end impact to immobilization means 9.

As shown in FIGS. 3 through 8, a variety of embodiments are possible as immobilization means 10 for retention of upper back part 5 against a backward motion of upper back part 5 out of the safety position into the normal use position, and of headrest 8 out of the interception position into the comfort position.

It has already been mentioned earlier that in order to suppress a spring-back or bounce-back effect upon activation of the protective device, said immobilization means 10 (recoil lock) are embodied in such a way that they allow immobilization not only in the normal use position and the safety position of upper back part 5, but also in positions located therebetween. As is clear from the various embodiments of the recoil lock described below, this can be achieved, for example, by means of self-locking rolling-element or wedge-type locks that operate positively and/or nonpositively (preferably by jamming), or by means of a ratchet device. For the embodiments of the recoil lock that are described it is advantageously possible, in the context of a suitable design of the recoil lock (size and number of rolling elements, slope of locking surfaces that become effective upon backward rotation, number and size of the teeth of a ratchet tooth set, etc.), to limit any recoil play of upper back part 5 (motion back opposite to pivot direction S toward the normal use position of back part 5) to a maximum angular magnitude of approximately 1 degree.

The embodiment according to FIGS. 3 and 4 shows an embodiment of immobilization means 10 for retention of upper back part 5, in particular crossmember 5a, as a snap-locking ratchet mechanism. A carrier element 10a for at least one, and in the embodiment depicted for two ratchet tooth sets 10b, 10c is attached within the pocket-shaped holding part 6b. The respective tooth set 10b, 10c coacts with at least one, and in the embodiment depicted with two teeth 4e, 4f on support part 4d, functioning as counterpart ratchet elements. The two tooth sets 10b, 10b c and the corresponding counterpart teeth 4e, 4f, which are each offset from one another, result in greater security for the ratchet connection, and in a reduction (by half) in the recoil play of upper back part 5.

The embodiment as depicted in FIG. 5 shows a configuration of immobilization means 10 for retention of upper back part 5. in particular crossmember 5a, as a rolling-element locking device. This rolling-element locking device comprises a ring gear 10d, arranged concentrically about pivot axis X—X of upper back part 5, that is arranged inside a cylindrical shell 10e; and rolling elements 10g arranged between teeth 10f of ring gear 10d and between ring gear 10d and shell 10e. Torsion spring 6a is immovably joined to ring gear 10d. The tooth flanks of teeth 10f of ring gear 10d are embodied in such a way that the rolling-element locking device permits pivoting (pivoting direction S) into the safety position of upper back part 5 and into the interception position of headrest 8, since rolling elements 10g can roll freely between ring gear 10d and shell 10e; whereas in the event of a motion in the opposite direction, jamming of rolling elements 10g between ring gear 10d and shell 10e occurs and inhibits this backward motion.

Figure 6:
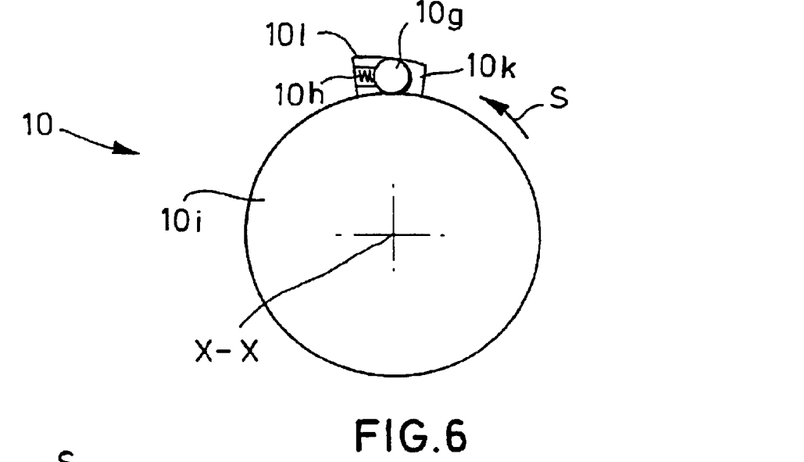
FIGS. 6 through 8 show three further embodiments of the immobilization means for retention of the upper back part against a backward motion out of the safety position into the normal use position of a seatback according to the present invention, in a sectioned side view corresponding to FIGS. 4 and 5.

A similar principle is also the basis of the embodiment of the recoil lock depicted in FIG. 6. This differs from the embodiment described above, however, in that rolling element or elements 10g are each under the load of a spring 10h, and that what comprises receptacles 10k for rolling elements 10g is not an inner part 10i corresponding to ring gear 10d and arranged concentrically about pivot axis X—X of upper back part 5, but rather a shell part 10l corresponding to cylindrical shell 10e. The manner of operation of this device corresponds to that described above. The walls of receptacles 10k of shell part 10l are embodied in such a way that the rolling-element locking device permits pivoting (pivoting direction S) into the safety position of upper back part 5 and into the interception position of headrest 8, since rolling elements 10g can roll freely between inner part 10i and shell part 10l against the action of spring 10h; whereas in the case of a motion in the opposite direction with the effect of spring 10h additionally acting in that direction, jamming of rolling elements 10g occurs and inhibits this backward motion.

Figure 7:
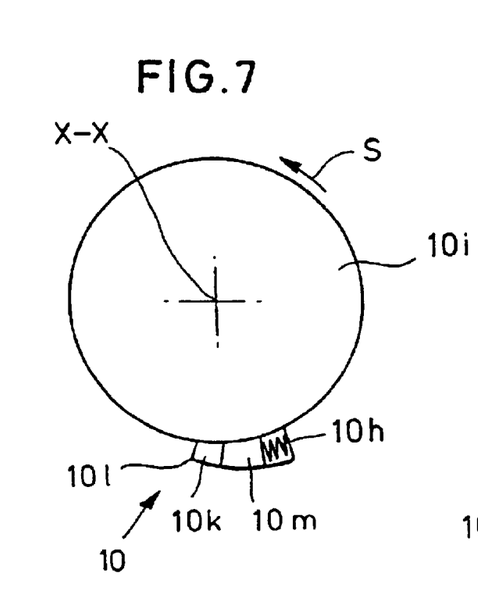

The embodiment of recoil lock depicted in FIG. 7 differs from that shown in FIG. 6 in that jamming wedges 10m are used instead of rolling elements 10g.

Figure 8:
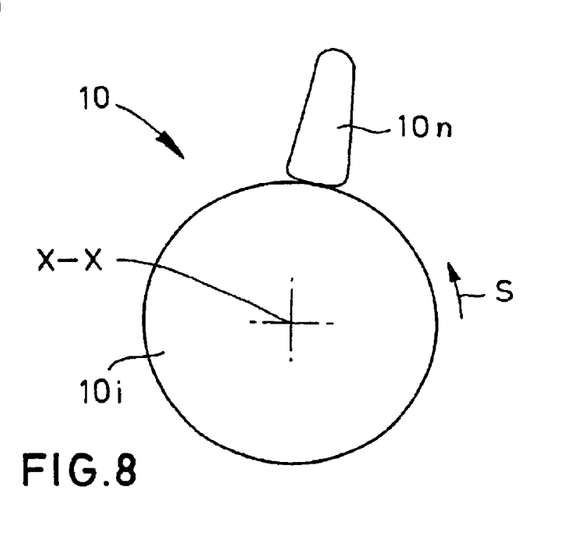

In the embodiment of the recoil lock depicted in FIG. 8, as in the two previous embodiments, a cylindrical inner part 10i having a smooth enveloping surface (or also one structured to increase friction, or equipped with a coating) is provided; but in the event of the backward motion described above, jamming is performed by means of at least one eccentrically mounted pivoting body. 10n engaging nonpositively on the enveloping surface of inner part 10i.

Figure 9:
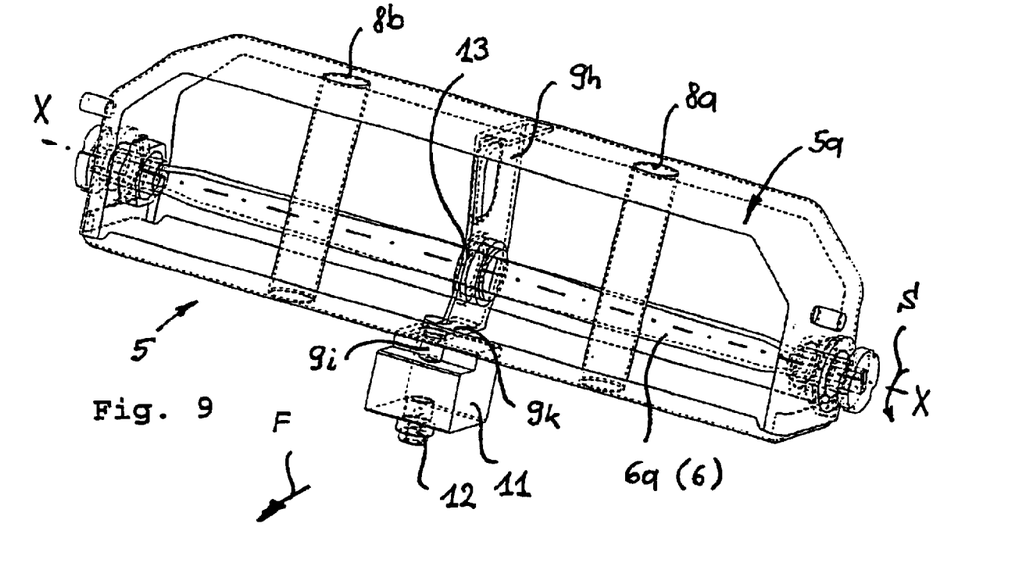
FIG. 9 is a perspective view of an upper part of a further preferred embodiment of a seatback according to the present invention.
Figure 10:
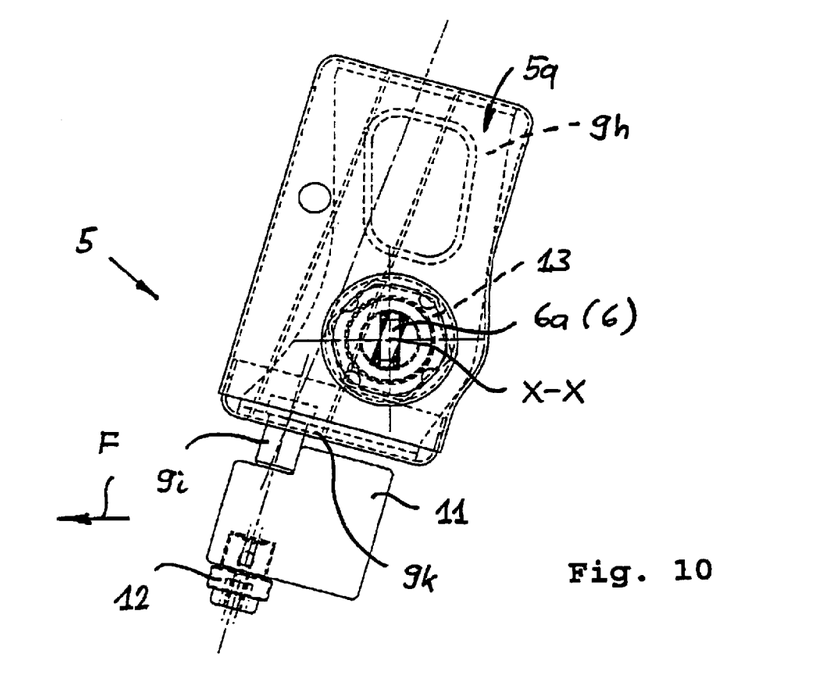
FIG. 10 is a side view of the embodiment depicted in FIG. 9 of a seatback according to the present invention.

As already mentioned, FIGS. 9 and 10 show two views of an upper part 5 of a further preferred embodiment of a seatback 2 according to the present invention. In this embodiment, the lever system of immobilization means 9 for retention A of upper back part 5 in the normal use position comprises a interlock lever 9h, immovably joined to upper back part 5, in particular via a holder 11 to crossmember 5a of back part 5, and to torque-generating device 6. In the embodiment shown, said lever is configured in particular as an angled lever pivotable about pivot axis X—X of upper back part 5, and is secured in a locked position (shown in FIGS. 9 and 10) by a locking bolt 9i. For that purpose, in the locked position locking bolt 9i engages through an opening 9k in one angled limb of interlock lever 9h, while the other angled limb is joined to torsion spring 6a. In the event of a crash, locking bolt 9i can be moved out of opening 9k in order to release torque-generating device 6 (concretely, torsion spring 6a).

Means 7 for detecting the rear-end impact are in effective connection U with immobilization means 9 for retention A of upper back part 5 in the normal use position (in the instance depicted, with locking bolt 9i), and immobilization means 9 (concretely, locking bolt 9i and interlock lever 9h) are in effective connection B with torque-generating device 6 (torsion spring 6a), in such a way that in the event of the impact, a release of torque-generating device 6 is initiated by immobilization means 9 pyrotechnically, i.e. preferably by means of a priming cartridge. Pyrotechnic device 12 serving this purpose can, as depicted, be arranged in holder 11 for locking bolt 9i.

In addition, unlike in the embodiments depicted previously, in the embodiment depicted in FIGS. 9 and 10 a special recoil lock 13, by way of which interlock lever 9h is joined to torsion spring 6a, is provided. This recoil lock 13 serves as an assembly aid, and blocks any pivoting of upper back part 5 in direction S out of its normal use position into its safety position, but permits pivoting in the opposite direction. Recoil lock 13 can be embodied as a self-locking rolling-element or wedge-type lock that operates positively and/or nonpositively (preferably by jamming), or as a ratchet device, in such a way that it makes possible immobilization even in positions located between the safety position and the normal use position of upper back part 5. In detail, recoil lock 13 can be configured in the same way as immobilization means 10 (described above) for retention K of the upper back part against backward motion out of the safety position into the normal use position, except that it acts in the opposite direction. Recoil lock 13 can advantageously result in easier assembly, for example in that locking bolt 9i is first inserted into opening 9k of interlock lever 9h, which for that purpose can preferably be configured as an elongated hole, and then torsion spring 6a is tensioned (opposite to direction S) with a tool; in this context, recoil lock 13 permits this tensioning, but prevents any undesired springing back (relaxation) of torsion spring 6a. Such relaxation of torsion spring 6a is possible in the event of a crash, however, since-after the removal of locking bolt 9i, interlock lever 9h that is held in place on torsion spring 6a by the recoil lock can also be moved.

As is already evident from the description above, the invention is not limited to the exemplary embodiments depicted, but also encompasses all embodiments that are functionally identical for purposes of the invention. For example, the lever system could also be embodied in a manner different from that depicted and described, and arranged elsewhere. As regards the depictions in the drawings, FIGS. 6 through 8 are depicted partially schematically. With regard to further possible details of seatback 2 according to the present invention and a method implementable therewith for preventing accident-related injuries to a seat user, the reader is referred to German Patent Application 199 38 904.7 mentioned earlier, in its entirety.

The invention furthermore is also not limited to the combination of features defined in claim 1, but rather can also be defined by any other desired combination of specific features of all the individual features disclosed globally. This means that in principle practically any individual feature of claim 1 can be omitted and replaced with at least one individual feature disclosed elsewhere in the Application. Claim 1 is in this respect to be understood as merely a first attempt at stating an invention.

What is claimed is:

1. A seatback for a vehicle seat, the seatback having an integrated protective device, comprising:

a lower back part adapted to be joined to a seat part;

an upper back part that is pivotable relative to the lower back part out of a normal use position, about an axis extending in the seatback transversely to a longitudinal vehicle axis, through an angular range in a pivoting direction pointing in a direction of vehicle travel, as a result of a torque acting in the pivoting direction, into a safety position;

a device for generating the torque, wherein the torque-generating device is constituted by a preloaded spring element or multiple preloaded spring elements;

means for detecting a rear-end impact; and immobilization means for retention of the upper back part in the normal use position;

wherein the device for generating the torque comprises a force storage device or an energy storage device acting irrespective of any occupancy of the vehicle seat, the means for detecting a rear-end impact comprising a vehicle crash sensor and the immobilization means comprising a lever system, the vehicle crash sensor being in effective connection with the force storage device or the energy storage device, and with the lever system constituting the immobilization means for retention of the upper back part, such that in the event of the rear-end impact, the retention of the upper back part in the normal use position is nullified, the force storage device or the energy storage device is activated, and the upper back part is pivoted in the pivoting direction.

2. The seatback of claim 1, wherein the spring element is constituted by a torsion spring arranged in the pivot axis.

3. The seatback of claim 1, wherein the means for detecting a rear-end impact is in effective connection with the immobilization means for retention of the upper back part in the normal use position, and immobilization means is in effective connection with the torque-generating device, in such a way that in the event of the impact, the preloaded spring element is released by the immobilization means.

4. A seatback for a vehicle seat, the seatback having an integrated protective device, comprising:

a lower back part adapted to be joined to a seat part;

an upper back part that is pivotable relative to the lower back part out of a normal use position, about an axis extending in the seatback transversely to a longitudinal vehicle axis, through an angular range in a pivoting direction pointing in a direction of vehicle travel, as a result of a torque acting in the pivoting direction, into a safety position;

a device for generating the torque;

means for detecting a rear-end impact; and immobilization means for retention of the upper back part in the normal use position;

wherein the device for generating the torque comprises a force storage device or an energy storage device acting irrespective of any occupancy of the vehicle seat, the means for detecting a rear-end impact comprising a vehicle crash sensor and the immobilization means comprising a lever system, the vehicle crash sensor being in effective connection with the force storage device or the energy storage device, and with the lever system constituting the immobilization means for retention of the upper back part, such that in the event of the rear-end impact, the retention of the upper back part in the normal use position is nullified, the force storage device or the energy storage device is activated, and the upper back part is pivoted in the pivoting direction;

wherein the lever system of the immobilization means for retention of the upper back part in the normal use position is constituted by at least two coacting levers.

5. A seatback for a vehicle seat, the seatback having an integrated protective device, comprising:

a lower back part adapted to be joined to a seat part;

an upper back part that is pivotable relative to the lower back part out of a normal use position, about an axis extending in the seatback transversely to a longitudinal vehicle axis, through an angular range in a pivoting direction pointing in a direction of vehicle travel, as a result of a torque acting in the pivoting direction, into a safety position;

a device for generating the torque;

means for detecting a rear-end impact; and immobilization means for retention of the upper back part in the normal use position;

wherein the device for generating the torque comprises a force storage device or an energy storage device acting irrespective of any occupancy of the vehicle seat, the means for detecting a rear-end impact comprising a vehicle crash sensor and the immobilization means comprising a lever system, the vehicle crash sensor being in effective connection with the force storage device or the energy storage device, and with the lever system constituting the immobilization means for retention of the upper back part, such that in the event of the rear-end impact, the retention of the upper back part in the normal use position is nullified, the force storage device or the energy storage device is activated, and the upper back part is pivoted in the pivoting direction;

wherein the lever system is constituted by a pawl, mounted pivotably in the upper back part, wherein the pawl in a locked position braces against a counterbearing that is stationary relative to the upper back part; and by a pivotably mounted immobilization lever that in a locked position engages into the pawl, and in a release position releases the pawl.

6. The seatback of claim 5, wherein the lever system is mounted in side walls of a holding part arranged in the upper back part.

7. The seatback of claim 6, wherein the counterbearing is arranged at an upper end of a support part that is immovably joined at the other end to the lower back part and projects into the holding part, and is constituted by a stop surface for a lobe of the pawl arranged approximately at an unattached lever end.

8. A seatback for a vehicle seat, the seatback having an integrated protective device, comprising:

a lower back part adapted to be joined to a seat part;

an upper back part that is pivotable relative to the lower back part out of a normal use position, about an axis extending in the seatback transversely to a longitudinal vehicle axis, through an angular range in a pivoting direction pointing in a direction of vehicle travel, as a result of a torque acting in the pivoting direction, into a safety position;

a device for generating the torque;

means for detecting a rear-end impact; and immobilization means for retention of the upper back part in the normal use position;

wherein the device for generating the torque comprises a force storage device or an energy storage device acting irrespective of any occupancy of the vehicle seat, the means for detecting a rear-end impact comprising a vehicle crash sensor and the immobilization means comprising a lever system, the vehicle crash sensor being in effective connection with the force storage device or the energy storage device, and with the lever system constituting the immobilization means for retention of the upper back part, such that in the event of the rear-end impact, the retention of the upper back part in the normal use position is nullified, the force storage device or the energy storage device is activated, and the upper back part is pivoted in the pivoting direction;

further comprising a second immobilization means for retention of the upper back part against a backward motion out of the safety position into the normal use position;

wherein the second immobilization means is configured as a snap-locking ratchet mechanism having at least one ratchet tooth set attached within the holding part, and having at least one tooth functioning as a counterpart ratchet element, arranged on the support part.

* * * * *